(12) United States Patent
Cain et al.

(10) Patent No.: US 6,430,347 B1
(45) Date of Patent: Aug. 6, 2002

(54) DISPERSION AND DISPERSION SLOPE COMPENSATED FIBER LINK

(75) Inventors: Michael B. Cain, Painted Post; V. Srikant, Ithaca, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/645,025

(22) Filed: Aug. 23, 2000

Related U.S. Application Data
(60) Provisional application No. 60/156,735, filed on Sep. 30, 1999.

(51) Int. Cl.[7] .................................................. G02B 6/02
(52) U.S. Cl. ..................... 385/123; 385/124; 385/126
(58) Field of Search ................................. 385/123, 124, 385/126, 127

(56) References Cited

U.S. PATENT DOCUMENTS

| | | | |
|---|---|---|---|
| 5,448,674 A | 9/1995 | Vengsarkar et al. | ......... 385/123 |
| 5,781,673 A | 7/1998 | Reed et al. | .................... 385/24 |
| 5,838,867 A | 11/1998 | Onishi et al. | ............... 385/123 |

FOREIGN PATENT DOCUMENTS

| | | | | |
|---|---|---|---|---|
| GB | 0 554 714 A1 | 8/1993 | ........... | H04B/10/18 |
| WO | WO 98/04941 | 2/1998 | | |
| WO | WO 00 67053 | * 11/2000 | ........... | G02B/6/16 |

OTHER PUBLICATIONS

A. Goel et al., "Wide Band Dispersion Compensating Optical Fiber", IEEE Photonics Technology Letters, vol. 8, No. 12, Dec. 1996, pp. 1668–1670.

Boness et al., "Lichtwellenleiter mit Besonderem Dispersionverhalten", Nachrichtentechnik Elektronik, vol. 42, No. 5, Sep. 1, 1992, pp. 184, 186–187.

* cited by examiner

*Primary Examiner*—Brian Healy
*Assistant Examiner*—Sarah U. Song
(74) *Attorney, Agent, or Firm*—William J. Chervenak

(57) ABSTRACT

Disclosed is a dispersion compensating waveguide fiber suitable for use in high data rate, high light power telecommunications systems of intermediate length. The refractive index profile of the compensation fiber is segmented. The segment relative refractive indexes and radii are chosen to provide negative total dispersion and negative total dispersion slope over an extended wavelength range. The index profile design is flexible enough to provide compensated links having total dispersion that is positive, negative, or zero, while maintaining appropriate total dispersion slope compensation. In addition, the waveguide fiber of the invention may be cabled or otherwise buffered prior to its use in a communications system.

21 Claims, 1 Drawing Sheet

DISPERSION AND DISPERSION SLOPE COMPENSATED FIBER LINK

This application claims the benefit of U.S. Provisional Patent Application Ser. No.60/156,735, filed Sep. 30, 1999.

BACKGROUND OF THE INVENTION

1. Field of the Invention

The present invention relates generally to dispersion compensating waveguide fibers, and particularly to such fibers that are cabled or otherwise buffered and incorporated into telecommunications links designed to operate over a range of wavelengths.

2. Technical Background

Telecommunication systems using high powered lasers, high data rate transmitters and receivers, and wavelength division multiplexing (WDM) technology require optical waveguide fiber having exceptionally low total dispersion and polarization mode dispersion (PMD). The term total dispersion means all linear dispersion, including material dispersion and waveguide dispersion. In the art, total dispersion is sometimes called chromatic dispersion. In addition, the waveguide fiber must have characteristics which essentially eliminate non-linear phenomena such as self phase modulation (SPM) and four wave mixing (FWM). SPM can be limited by lowering power density, for example by increasing the mode field diameter or the effective area of the waveguide fiber. FWM is controlled by operating in a wavelength range over which dispersion of the fiber is non-zero.

Due to this requirement of non-zero dispersion, communication systems become dispersion limited at the very high bit rates. Consequently, dispersion compensating modules are typically employed to compensate for dispersion accumulated over a transmission link operating in, for example, the 1550 nm wavelength window. In order for the compensating fiber employed in the module not to become a limiting factor in the link, it should have functional parameters at least similar to the waveguide fibers in the link being compensated. For example, it is desirable for the compensating fiber to have similar effective area, cut off wavelength, and attenuation in comparison to the waveguide fiber in the link being compensated.

This desired performance is difficult to achieve, however. Usually some compromises in the form of design tradeoffs must be made. In one compensating scheme, a fiber having a very large dispersion, of sign opposite that of the dispersion of the cabled fiber forming the link, is contained within a dispersion compensating module and inserted into the link. For example, a telecommunications link comprising positive dispersion cabled fiber can be deployed in a link having regenerator spacing of about 100 km. A dispersion compensating module comprising fiber having a total dispersion at 1550 nm of about −70 ps/nm-km to −100 ps/nm-km typically would serve to compensate for the positive dispersion accumulated in the link. The length of fiber in the dispersion compensating module should be short in order to keep the module size relatively small and to minimize the attenuation added to the link by the dispersion compensating module. The attenuation of the fiber in the dispersion compensating module is typically much higher than that of the cabled or otherwise buffered fiber forming the link. The dispersion compensating module is essentially another link component that does not serve as a part of the link length. That is, the module does not serve as a part of the length that bridges the distance between transmitter and receiver.

Many of the high performance transmission links make use of wavelength division multiplexing (WDM) to maximize the information capacity of the links. This places an added requirement on the fiber of the dispersion compensating module in that compensation is desired over an extended wavelength range. Dispersion compensation over a wavelength range can be accomplished by control of the slope of the compensating fiber. A desirable target range of wavelengths for compensation corresponds to the wavelength range over which the gain versus wavelength curve of optical amplifiers, present in the transmission link, is relatively constant.

SUMMARY OF THE INVENTION

A first aspect of the present invention is a dispersion compensating optical waveguide fiber having a core region surrounded by a clad layer. In systems that are bandwidth limited, the waveguide fiber is preferably operated in a wavelength range over which only a single mode is propagated. Because the fiber guides light through its length, at least a portion of the clad layer must have a refractive index lower than that of at least a portion of the core region. The core region of the compensating single mode fiber preferably includes at least three segments. Substantially centered about the symmetry line of the fiber is a central segment having a relative refractive index $\Delta_0\%$ in the range of about 0.6% to 1.1%. The central segment is surrounded by a first annular region of negative relative refractive index, which in turn is surrounded by a second annulus of positive relative index. The relative refractive index of the first annular segment $\Delta_1\%$ is more negative than about −0.4%. The relative index of the second annular segment $\Delta_2\%$ is greater than 0. The waveguide fiber so configured provides a negative total dispersion and a total dispersion slope more negative than about −0.2 ps/nm$^2$-km over a pre-selected wavelength range that includes the wavelength 1550 nm.

In an embodiment of this aspect, the pre-selected wavelength range is about 1500 nm to 1700 nm and preferably 1520 nm to 1650 nm.

In a further embodiment of this aspect of the invention, the core region includes a third annular segment surrounding the second annular segment and having a relative index $\Delta_3\% \leq 0.2\%$ In yet a further embodiment of this aspect, the core region includes a fourth annular segment having relative index $\Delta_4\% \geq 0$. More specifically, the relative index range of $\Delta_2\%$ is about −0.4% to 0.5%, of $\Delta_3\%$ is about −0.2% to 0.2%, and of $\Delta4\%$ is about 0 to 0.6%.

In another embodiment of this first aspect of the invention, $\Delta_0\%$ is in the range of about 0.8% to 1.1%, $\Delta_1\%$ is more negative than −0.5%, $\Delta_2\%$ is in the range of about −0.1% to 0.1%, $\Delta_3\%$ is in the range of about −0.1% to 0.1%, and $\Delta_4\%$ is in the range of about 0.3% to 0.5%.

For each of these embodiments, attenuation values at 1550 nm are no greater than about 0.34 dB/km.

A second aspect of the invention is an optical waveguide fiber link, preferably using wavelength division multiplexing, that incorporates cabled waveguide fiber optically coupled to a cabled total dispersion and total dispersion slope compensating waveguide fiber (cabled compensating fiber). The definition of cabled compensating fiber is used consistently herein. Compensating over a range of wavelengths is equivalent to compensating total dispersion slope. High performance, fully or partially compensated links typically employ single mode waveguide fiber. However, the invention is applicable to two or more modes propagating in a waveguide fiber links as well.

Referring to FIG. 3, the link includes transmitter 58, cabled waveguide fiber 60, cabled compensating fiber 62 and receiver 64. Cabled waveguide fiber 60, preferably a single mode transmission fiber, and cabled compensating fiber 62 are optically coupled end to end in series to form the link length. The transmitter and receiver are designed for use in wavelength division multiplexed links. In one embodiment of the invention, the compensating fiber is made in accord with the first aspect of the invention and is cabled or otherwise buffered to form a portion of the link. The term cabled waveguide fiber as used throughout this application refers to the plurality of structures known in the art that may include buffered, stranded, or jacketed optical waveguide fiber. These structures may be deployed or installed essentially in the same way as any other communications cable. The link is designed so that the cabled transmission fiber is interposed between the cabled compensating fiber and a transmitter optically coupled to the cabled fiber. The transmitter is capable of launching into the cabled fiber a plurality of wavelengths selected from the particular wavelength range of the multiplexed signals. A receiver capable of receiving the plurality of launched wavelengths is optically coupled to the remaining end of the cabled compensating waveguide fiber. The compensating cable, preferably made in accord with the first aspect of the invention, can be designed to provide an end to end total dispersion (the sum of the total dispersion of the cabled transmission waveguide and the cabled compensating waveguide) of less than about +/−10 ps/nm at each of the launched wavelengths. The cabled compensating fiber has a total dispersion of opposite sign relative to the cabled fiber. The dispersion sum is the algebraic sum of the cabled waveguide dispersion and the cabled compensating waveguide dispersion.

In an embodiment of this aspect, the cabled dispersion compensating waveguide fiber is designed to completely compensate the dispersion of the cabled waveguide fiber so that the link total dispersion is zero at each of the wavelengths propagated in the link.

In another embodiment, the cabled compensating fiber is designed to provide and end to end total link dispersion that is positive. A preferred embodiment is one in which the end to end link dispersion is no greater than about 4 ps/nm.

An alternative embodiment incorporates a cabled dispersion compensating waveguide that provides a negative end to end link total dispersion no more negative than about −4ps/nm.

When the slope compensation is uniform across the pre-selected wavelength range, the individual dispersion sums are equal. Such a configuration allows for uniform performance among the link channels. Each channel can thus be used at substantially equivalent bit rates over equal lengths. In addition, the configuration is compatible with soliton signal multiplexing.

In each of the aspects and embodiments disclosed and described above, the pre-selected wavelength range may be from about 1500 nm to 1700 nm. Preferably, the pre-selected wavelength range is 1520 nm to 1650 nm.

This aspect of the invention results in a number of advantages over prior art dispersion compensating modules. By incorporating a cabled or otherwise buffered fiber as a part of the link length to compensate (cabled compensating fiber) at least partially for the link dispersion over a range of wavelengths, the requirements placed on the dispersion compensating module could be relaxed. The compensating module would be lower in cost, easier to manufacture, and shorter in length.

Further, some systems are designed to have incomplete dispersion and dispersion slope compensation, in which case the presence of the cabled compensating fiber in the link would obviate the need for the compensating module.

This compensating scheme is applicable to high performance multiplexed systems of any length. It is very well suited for use in intermediate length telecommunication systems that incorporate wavelength division multiplexing. An intermediate length telecommunication system is one in which regenerator spacing is in less than 100 km, for example in the range 10 km to 60 km. In such systems, the need for large negative dispersion slope is required together with an intermediate total dispersion in the range of about −4 ps/nm-km to −40 ps/nm-km. Cabled compensating fiber having these properties can also be used in those systems in which complete compensation is not desirable, for example in soliton systems, or systems dominated by four wave mixing.

The present invention provides a fiber that compensates for total dispersion and total dispersion slope and furthermore is sufficiently bend resistant to allow cabling or other types of buffering. These other types of buffering are known in the art and include, for example, insertion of the fiber into a slotted member which is then jacketed.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Reference will now be made in detail to the present preferred embodiments of the invention, examples of which are illustrated in the accompanying drawings. The general features of the waveguide fiber refractive index profile of the invention are illustrated in the refractive index profile of FIG. 1.

Figure 3:
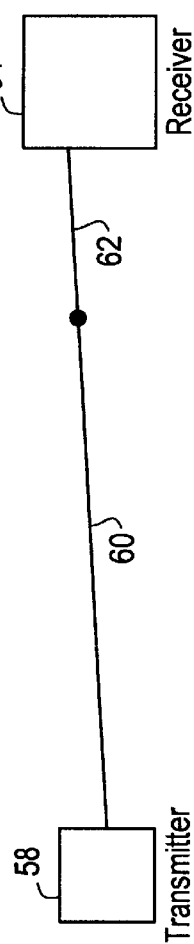
FIG. 3 is a schematic of a compensated communications link using the cabled waveguide fiber of the present invention.

The general features of a waveguide fiber telecommunications link of the present invention appear in FIG. 3. In FIG. 3, the relative positioning of the cabled transmission fiber 60 and cabled compensating fiber 62 illustrates a feature of the invention.

In the link of FIG. 3, placement of the cabled compensated fiber at the receiver end of the link removes the requirement that the cabled compensating fiber have large effective area. That is, the signal is sufficiently attenuated in the cabled fiber portion of the link so that non-linear effects are not important in the cabled compensating fiber. The advantage of such a link design is that it relieves restrictions on both the cabled fiber 60 and cabled compensating fiber 62. For example, cabled fiber 60 can be designed to have large effective area to control non-linear effects over the portion of the link length where signal power is high. Then cabled compensating fiber 62 can be designed to fully or partially compensate the dispersion and dispersion slope of the large effective area cabled fiber, so that ranges of dispersion and dispersion slope of cabled fiber 60 may be broadened. However, cabled compensating fiber 62 need not have large effective area because the signal is attenuated in the cabled fiber 60 so that non-linear effects are less important in the compensating cabled fiber. The desired properties of both cable portions 60 and 62 in FIG. 3 of the link are therefore broadened or are fewer in number because of the manner in which the two portions of the link work together.

Figure 1:
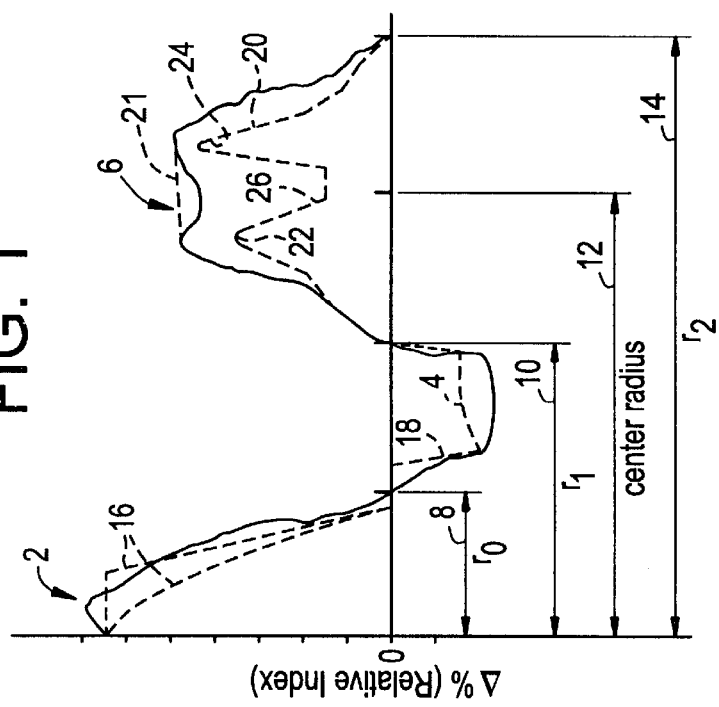
FIG. 1 is an illustration of a refractive index profile that exhibits the main features of the profile of the present invention.

Referring now to FIG. 1, the index profile includes a central segment 2, a first annular segment 4, and a second annular segment 6. Each segment is characterized by a relative index percent, $\Delta_i\%$ defined as the ratio $(n_i^2 - n_c^2)/2n_i^2$, where $n_i$ is the maximum refractive index of core segment i and $n_c$ is the reference refractive index which is taken to be the minimum index of the clad layer unless specifically indicated otherwise. Also each segment has an inner and an outer radius measured from the waveguide fiber centerline.

The definition of radii for each segment is shown in FIG. 1. Central segment 2 has inner radius zero and outer radius, $R_0$, 8, measured from the fiber centerline to the point where the relative index of segment 2 is zero; first annular segment 4 has inner radius 8, and outer radius, $R_1$, 10; and, second annular segment 6 has inner radius $R_1$, and outer radius, $R_2$, 14. In this embodiment of the invention, the second annular segment is the last segment of the core region so that $R_2$ also defines the core region radius. In some cases, a center radius 12, drawn to the geometric center of the final segment of the core, is defined.

The features of the profile of FIG. 1 are that the central segment has a positive relative refractive index, the first annulus has a negative relative index, and the second annulus can include a multi-peak structure. Dashed lines 16, 18, 20, and 22 in FIG. 1 show alternative shapes of the central profile, the first annular segment and the second annular segment, respectively. Dashed line 20 shows relative index peaks 22 and 24 separated by a lower constant relative index portion 26. The refractive index profile shown in FIG. 1 is designed to provide a particular power distribution of signal light propagating in the waveguide fiber. It is this power distribution that results in the waveguide fiber having a desired negative dispersion and negative dispersion slope over a pre-selected range of wavelengths. At the same time, the power distribution of light signals propagating in the waveguide is controlled to provide such characteristics as single mode operation above a pre-selected wavelength, low attenuation, and properly placed zero dispersion wavelength. The multi-peak structure of the second annulus can be advantageously designed to maintain low bend induced attenuation even though a portion of the propagated light power is being moved farther from the waveguide centerline.

Figure 2:
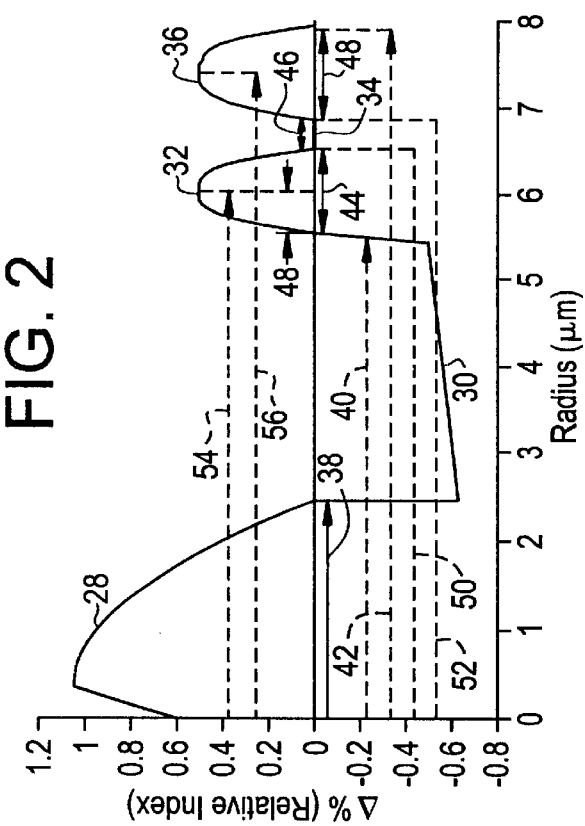
FIG. 2 is an illustration of an embodiment of the refractive index profile of the present invention.

A preferred embodiment of the refractive index profile of the dispersion compensating waveguide is shown in FIG. 2. The core regions includes the five segments, central segment 28, first annular segment 30, second annular segment 32, third annular segment 34, and fourth annular segment 36. The respective relative indexes ranges of the five segments, counted outwardly form the centerline and beginning at zero, $0.6\% \leq \Delta_0\% \leq 1.1\%$, $\Delta_1\% \leq -0.4\%$, $-0.4\% \leq \Delta_2\% \leq 0.5\%$, $-0.2\% \leq \Delta_3\% \leq 0.2\%$, and $0 \leq \Delta_4\% \leq 0.6\%$.

In a more preferred embodiment the respective ranges of the relative indexes are $0.8\% \leq \Delta_0\% \leq 1.1\%$, $\Delta_1\% \leq -0.5\%$, $-0.1\% \leq \Delta_2\% \leq 0.1\%$, $-0.1\% \leq \Delta_3\% \leq 0.1\%$, and $0.3\% \leq \Delta_4\% \leq 0.5\%$.

The relative index ranges of these last two embodiments, together with a description of the geometry of the five segments appear in Table 1 and Table 2, respectively.

TABLE 1

Profile Range

| Segment | Alpha | Delta % | Radial Dependence |
|---|---|---|---|
| Central | 1.5–8 | 0.6–1.1 | 1.6–4 = $R_o$ |
| 1$^{st}$ annulus | 2–8 | −0.4–0.7 | Ratio of $R_o$/R1 0.25–0.7 |
| 2$^{nd}$ annulus | | −0.4–0.5 | Peak at 0.3–1.0 microns from 1$^{st}$ annulus outer edge |
| 3$^{rd}$ annulus | | −0.2–0.2 | 0.0–10 = width |
| 4$^{th}$ annulus | | 0.0–0.6 | Peak at 0.6–10.0 microns from 1$^{st}$ annulus outer edge |

TABLE 2

Preferred Profile Range

| Segment | Alpha | Delta % | Radial Dependence |
|---|---|---|---|
| Central | >4 | 0.8–1.1 | 1.8–2.4 |
| 1$^{st}$ annulus | | <−0.5 | Ratio of Rc/R1 0.4–0.5 |
| 2$^{nd}$ annulus | | −0.1–0.1 | Peak at 0.4–0.5 microns from 1$^{st}$ annulus outer edge |
| 3$^{rd}$ annulus | | −0.1–0.1 | 1.0–7.0 width |
| 4$^{th}$ annulus | | 0.3–0.5 | Peak at 1.0–7.0 microns from 1$^{st}$ annulus outer edge |

Referring to Table 1, and FIG. 2, the central segment outer radius 38, $R_0$, is in the range of about 1.6 μm to 4 μm. The first annular segment has outer radius 40, $R_1$, and the ratio $R_0/R_1$ is in the range of about 0.25 to 0.70, thus linking the radii of the central segment and the first annular segment. The second annular segment has inner radius 40 and a first width 48 in the range of about 0.3 μm to 1 μm. This first width is the difference between $R_1$ and the radial position 54 of peak relative index, $R_{peak}$, of the second annulus. The second width 44 associated with the second annular segment is in the range of about 0.7 μm to 2 μm, and is the difference between radius 40, $R_1$, and the outer radius 50, $R_2$, of the second annular segment.

The third annular segment 46 has a width in the range of about 0 to 10 μm, where the width is measured as the difference between the radius 52, $R_3$, and the radius 50, $R_2$. The fourth annular segment has a first width in the range of about 0.6 μm to 10 μm, and a second width in the range of about 1 μm to 2.5 μm. The first width is measured as the difference between radius 52, $R_3$, and the radial position 56, $R_{peak}$, of peak relative index of the fourth annular segment. The second width associated with the fourth annular segment is the difference between the inner radius 52, $R_3$, and the outer radius 42, $R_4$, of the fourth annular segment.

Referring now to Table 2 and FIG. 2 the geometry of the more preferred embodiment is defined analogously. The central segment outer radius 38, $R_0$, is in the range of about 1.8 μm to 2.4 μm. The first annular segment has outer radius 40, $R_1$, and the ratio $R_0/R_1$ is in the range of about 0.4 to 0.5, thus linking the respective radii of the central segment and the first annular segment. The second annular segment has inner radius 40 and a first width 48 in the range of about 0.4 μm to 0.5 μm. This first width is the difference between $R_1$ and the radial position 54 of peak relative index, $R_{peak}$, of the second annulus. The second width 44 associated with the second annular segment is in the range of about 0.7 μm to 1.5 μm, and is the difference between radius 40, $R_1$, and the outer radius 50, $R_2$, of the second annular segment.

The third annular segment 46 has a width in the range of about 1 to 7 μm, where the width is measured as the difference between the radius 52, $R_3$, and the radius 50, $R_2$. The fourth annular segment has a first width in the range of about 1 μm to 7 μm, and a second width in the range of about 1 μm to 2 μm. The first width is measured as the difference between radius 52, $R_3$, and the radial position 56, $R_{peak}$, of peak relative index of the fourth annular segment. The second width associated with the fourth annular segment is the difference between the inner radius 52, $R_3$, and the outer radius 42, $R_4$, of the fourth annular segment.

The index profile information in Tables 1 and 2 shows that the waveguide fiber properties depend more strongly upon the radii $R_0$ and $R_1$ as compared to the radii $R_3$ and $R_4$. Further, the placement of the first peak in relative index of the second annular ring has greater effect on the signal power distribution than does either the width of the third annular ring or the placement of the peak relative index of the fourth annular ring. Thus the refractive index profile described and disclosed here has a first set of structural features which may be changed to affect large changes in fiber properties and a second set of structural features that may be used to fine tune the waveguide fiber properties.

In any of the refractive index profiles described herein, in particular the index profiles of the preferred and more preferred embodiments, the shape of the refractive index profile in any of the segments may be selected from the group consisting of an α-profile, a step, a rounded step, a trapezoid, and a rounded trapezoid. The term α-profile is known in the art and is defined by the equation, $\Delta(b)\% = \Delta(b_0)(1-[|b-b_0|/|b_1-b_0|]^\alpha)$, where $b_0$ is the maximum point of the profile and $b_1$ is the point at which $\Delta(b)\%$ is zero and b is in the range $b_i \leq b \leq b_f$, where $\Delta\%$ is defined above, $b_i$ is the initial point of the α-profile, $b_f$ is the final point of the α-profile, and α is an exponent which is a real number. A preferred range of α for those embodiments having an α-profile as the central segment shape is about $1.5 \leq \alpha \leq 8$. In the more preferred embodiment having a α-profile shaped central segment, $\alpha \geq 4$.

Reference is made to Provisional U.S. patent application Ser. No. 60/131,879 ('879), which is incorporated herein by reference as though fully set forth in its entirety, for a description of profiles similar in structure and function to the refractive index profiles of the present invention. The structural differences between the refractive index profiles of the '879 reference and those of the present invention are unambiguous. The difference in function between the two is that the total dispersion slope of refractive indexes of the present application is more negative at a less negative value of total dispersion as compared to the waveguide fiber disclosed and described in '879. The feature of larger negative slope at less negative values of total dispersion makes the waveguide fibers of the present invention particular suited to compensating telecommunication links, similar to those described below, that carry high data rates or make use of wavelength division multiplexing.

More particularly, the compensating waveguide of the present invention has total dispersion in the range of about −4 ps/nm-km to −40 ps/nm-km.

Some examples of the cabled waveguide fiber links comprising a cabled waveguide fiber length and a cabled compensating fiber length of the present invention are set forth in Table 3.

TABLE 3

| Length (km) | Total Dispersion (ps/nm-km) | Total Dispersion Slope (ps/nm2-km) |
|---|---|---|
| Dispersion Shifted Cabled Fiber | | |
| 30 | 3.5 | 0.10 |
| 40 | 3.5 | 0.10 |
| 50 | 3.5 | 0.10 |
| 60 | 3.5 | 0.10 |
| 30 | 3.5 | 0.085 |
| 40 | 3.5 | 0.085 |
| 50 | 3.5 | 0.085 |
| 60 | 3.5 | 0.085 |
| Cabled Compensating Fiber | | |
| 10 | −10.5 | −0.3 |
| 10 | −14 | −0.4 |
| 10 | −17.5 | −0.5 |
| 10 | −21 | −0.6 |
| 10 | −10.5 | −0.255 |
| 10 | −14 | −0.34 |
| 10 | −17.5 | −0.425 |
| 10 | −21 | −0.51 |

Table 3 shows eight link compensation schemes, four for each of two cabled dispersion shifted fiber types. In the first set of four, a cabled dispersion shifted fiber having total dispersion of 3.5 ps/nm-km and total dispersion slope 0.10 ps/nm$^2$ is optically coupled to a cabled dispersion compensating fiber to form a dispersion compensated link. The total dispersion characteristics of the cabled compensating fiber are selected to provide zero end to end total dispersion of the link over a pre-selected wavelength range. Such a compensated link is said to be fully compensated for total dispersion and for total dispersion slope. Each row of Table 3 is a fully compensated link. For example, the first row of Table 3 pertains to a link having 30 km of cabled dispersion shifted fiber having large effective area and 10 km of cabled compensating fiber.

The cabled dispersion shifted fiber has total dispersion 3.5 ps/nm-km and total dispersion slope of 0.10 ps/nm$^2$-km. To fully compensate the link, the cabled dispersion compensating fiber is designed to have total dispersion −10.5 ps/nm-km and total dispersion slope −0.3 ps/nm$^2$-km. The end to end total dispersion of the link is then given by the sum, (30 km)(3.5 ps/nm-km)+(10 km)(−10.5 ps/nm-km)=0. The ratio of total dispersion and total dispersion slope is the same for both the dispersion shifted fiber and the compensating fiber, that is, (3.5 ps/nm-km)/(0.10 ps/nm$^2$/km)=(−10.5 ps/nm-km)/(−0.3 ps/nm$^2$-km). Therefore the dispersion of the link will be zero over a range of wavelengths, i.e., the link is slope compensated.

The characteristics of 10 km of cabled compensating waveguide fiber to compensate 40 km, 50 km, and 60 km lengths of dispersion shifted fiber are given in Table 3. The desired total dispersion and total dispersion slope values set forth in Table 3 are typical of those that are included in the scope of the present invention. For example, a cabled compensating waveguide fiber having total dispersion −21 ps/nm-km and total dispersion slope of −0.6 ps/nm²-km falls within the scope of the present refractive index profile invention.

The final four rows of Table 3, show the desired cabled compensating waveguide fiber properties for links including cabled dispersion shifted waveguide fiber have a total dispersion of 3.5 ps/nm²-km and a total dispersion slope of 0.085 ps/nm²-km. In this case as well both total dispersion and total dispersion slope are compensated so that end to end total dispersion of the link is about zero over an extended wavelength. The preferred wavelength range for slope compensation is about 1500 nm to 1700 nm, and a more preferred range is 1520 nm to 1650 nm. This latter wavelength range covers the low attenuation window around 1550 nm which extends up into the so-called L-band from about 1600 nm to 1650 nm.

In terrestrial applications, using wavelength division multiplexing, one wishes the total dispersion to be positive over the link length to avoid losses due to the non-linear effect of four wave mixing. For certain submarine applications a negative total dispersion enhances the performance of the system. Thus full dispersion compensation is not desired in these applications. The scope of the invented compensating waveguide fiber and cabled compensating waveguide fiber functioning in a link, disclosed and described here, includes partially compensated telecommunications fiber links.

Table 4 shows a compensation scheme in which the properties of the cabled compensating fiber are chosen to provide a slightly negative dispersion along the link length.

compensating fiber divided by the link length. For example, [(10 km)(−0.25 ps/nm²-km)+(30 km)(0.10 ps/nm²-km)]/40 km=0.0125 ps/nm²-km is the residual slope for the 40 km link described in Table 4.

For the cabled dispersion shifted fiber having a total dispersion slope of 0.085, the last column in Table 4 shows the residual slope of the links range from zero to 0.037.

The cabled compensating fiber thus provides negative total dispersion and good total dispersion slope compensation for link lengths from 40 km to 70 km. A manufacturing and cost advantage is realized because the link is well compensated even though the compensating fiber was not changed when link length or total dispersion slope of the dispersion shifted fiber was changed.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

What is claimed is:

1. A dispersion compensating optical waveguide fiber comprising:

a core region having a refractive index profile and a centerline; and, a clad layer surrounding and in contact with said core region, said clad layer having a refractive index profile, wherein said core and clad refractive index profiles are configured to guide light; wherein, said core region includes at least four segments, each said segment having respective inner and an outer radii referenced to the centerline and a respective refractive index profile,

TABLE 4

| DS Fiber Length | Comp. Fiber Length (km) | Total Dispersion (ps/nm-km) | Total Dispersion Slope (ps/nm²-km) | Residual Dispersion for 3.5 ps/nm-km fiber | Residual Dispersion for 3.5 ps/nm-km fiber | Residual Slope 01 (ps/nm²-km) | Residual Slope 0.085 (ps/nm²-km) |
|---|---|---|---|---|---|---|---|
| 30 | 10 | −25 | −0.25 | −3.625 | −3.625 | 0.0125 | 0 |
| 40 | 10 | −25 | −0.25 | −2.2 | −2.2 | 0.03 | 0.018 |
| 50 | 10 | −25 | −0.25 | −1.25 | −1.25 | 0.042 | 0.03 |
| 60 | 10 | −25 | −0.25 | −0.57 | −57 | 0.05 | 0.037 |

The cabled compensating waveguide fiber in every case in Table 4 has total dispersion −25 ps/nm-km and total dispersion slope −0.25 ps/nm²km. For a cabled dispersion shifted fiber of dispersion 3.5 ps/nm-km and length of 30 km, the total dispersion of the 40 km link is −3.625 ps/nm-km for a cabled compensating fiber length of 10 km. That is, [(−25 ps/nm-km)(10 km)+(3.5 ps/nm-km)(30 km)]/40 km=−3.625 ps/nm-km. The remaining three rows of data show that the total dispersion is negative for link lengths of 50 km, 60 km, and 70 km. Each of these three links contains 10 km of cabled compensating waveguide fiber and 40 km, 50 km, and 60 km, respectively, of cabled dispersion shifted fiber.

In addition, the cabled compensating fiber provides good dispersion slope compensation for each of the four links represented. In the second to last column of Table 4, the residual (uncompensated) slope, for a cabled dispersion shifted fiber of total dispersion slope 0.1 ps/nm²-km, ranges from 0.0125 to 0.05. The residual slope is defined analogously to the residual link dispersion above. The residual dispersion slope is the sum of products of total dispersion slope and length for the dispersion shifted fiber and the a central segment located about the centerline and having a relative index $\Delta_0\%$ in the range of about 0.6% to 1.1%, a first annular segment surrounding the central segment and having a relative index $\Delta_1$ more negative than about −0.4%, a second annular segment surrounding the first annular segment having a relative index $\Delta_2\% \geq 0$ and, a third annular segment having an inner and an outer radius referenced to the centerline, a refractive index profile and a relative index $\Delta_3\% \leq 0.2\%$; wherein, said core region refractive index profile is chosen to provide a negative total dispersion and a total dispersion slope more negative than about −0.2 ps/nm²-km, over a wavelength range from 1500 nm to 1700 nm .

2. The dispersion compensating fiber of claim 1 wherein the wavelength range is about 1520 nm to 1650 nm.

3. The dispersion compensating fiber of claim 1 further including a fourth annular segment having an inner and an outer radius, a refractive index profile and a relative index $\Delta_4\% \geq 0$.

4. The dispersion compensating fiber of claim 3 wherein $\Delta_2\%$ is in the range of about −0.4% to 0.5%, $\Delta_3\%$ is in the range of about −0.2% to 0.2%, and $\Delta_4\%$ is in the range of about 0 to 0.6%.

5. The dispersion compensating fiber of claim 3 wherein $\Delta_0\%$ is in the range of about 0.8% to 1.1%, $\Delta_1\%$ is more negative than −0.5%, $\Delta_2\%$ is in the range of about −0.1% to 0.1%, $\Delta_3\%$ is in the range of about −0.1% to 0.1%, and $\Delta_4\%$ is in the range of about 0.3% to 0.5%.

6. The dispersion compensating fiber of either one of claims 4 or 5 wherein, the central segment outer radius $R_0$ is in the range of about 1.6 μm to 4 μm, the first annular segment has outer radius $R_1$ and the ratio $R_0/R_1$ is in the range of about 0.25 to 0.70, the second annular segment has a first width in the range of about 0.3 μm to 1 μm and a second width in the range of 0.7 μm to 2 μm, wherein the first width is measured as the difference between $R_1$ and the radial position of peak relative index of the second annulus $R_{2peak}$, and the second width is measured as the difference between the inner radius $R_{2inner}$ and the outer radius $R_2$ of the second annular segment, the third annular segment has a width in the range of about 0 to 10 μm, wherein the width is measured as the difference between the outer radius $R_2$ of the second annular segment and the inner radius $R_{4inner}$ of the fourth annular segment, the fourth annular segment has a first width in the range of about 0.6 μm to 10 μm, and a second width in the range of about 1 μm to 2.5 μm, wherein the first width is measured as the difference between $R_1$ and the radial position of peak relative index of the fourth annular segment $R_{4peak}$, and the second width is measured as the difference between the inner radius $R_{4inner}$ and the outer radius $R_4$ of the fourth annular segment.

7. The dispersion compensating fiber of either one of claims 4 or 5 wherein, the central segment outer radius $R_0$ is in the range of about 1.8 μm to 2.4 μm, the first annular segment outer has outer radius $R_1$ and the ratio $R_0/R_1$ is in the range of about 0.4 to 0.5, the second annular segment has a first width in the range of about 0.4 μm to 0.5 μm and a second width in the range of 0.7 μm to 1.5 μm, wherein the first width is measured as the difference between $R_1$ and the radial position of peak relative index of the second annulus $R_{2peak}$, and the second width is measured as the difference between the inner radius $R_{2inner}$ and the outer radius $R_2$ of the second annular segment, the third annular segment has a width in the range of about 1 μm to 7 μm, wherein the width is measured as the difference between the outer radius $R_2$ of the second annular segment and the inner radius $R_{4inner}$ of the fourth annular segment, the fourth annular segment has a first width in the range of about 1 μm to 7 μm, and a second width in the range of about 1 μm to 2 μm, wherein the first width is measured as the difference between $R_1$ and the radial position of peak relative index of the fourth annular segment $R_{4peak}$, and the second width is measured as the difference between the inner radius $R_{4inner}$ and the outer radius $R_4$ of the fourth annular segment.

8. The dispersion compensating fiber of any one of claims 1–5 wherein the respective refractive index profiles of the segments have a respective shape selected from the group consisting of an α-profile, a step, a rounded step, a trapezoid, and a rounded trapezoid.

9. The dispersion compensating fiber of any one of claims 1–5 wherein the profile shape of the central segment is a α-profile having an α in the range of about 1.5 to 8.

10. The dispersion compensating fiber of any one of claims 1–5 wherein the profile shape of the central segment is a α-profile having an α>4.

11. The dispersion compensating fiber of any one of claims 1–5 wherein the total dispersion is in the range of about −4 ps/nm-km to −40 ps/nm-km.

12. An optical waveguide fiber link for communications comprising:

a cabled optical waveguide fiber having a first and a second end, and respective positive end to end dispersions at wavelengths selected from a wavelength band from 1500 nm to 1700 nm;

a cabled dispersion compensating waveguide fiber, having respective negative end to end dispersions at wavelengths selected from said wavelength band, a first end of said cabled dispersion compensating waveguide fiber being optically coupled in series arrangement to the first end of said cabled waveguide fiber to form a part of the link;

a transmitter optically coupled to the second end of the cabled waveguide fiber, wherein said transmitter launches into the second end of said cabled waveguide fiber respective light signals at each of the wavelengths selected; and, a receiver optically coupled to a second end of the cabled compensating waveguide fiber, wherein said receiver receives light signals at each of the wavelengths selected; wherein, the respective end to end dispersion of the cabled waveguide fiber and the respective end to end dispersion of the cabled compensating waveguide fiber are of opposite sign and result in respective dispersion sums at each of the selected wavelengths; and, the respective dispersion sums are in the range from 6 ps/mn-km to −6 ps/nm-km.

13. The optical waveguide fiber link of claim 12 wherein the respective dispersion sums are about zero.

14. The optical waveguide fiber link of claim 12 wherein the respective dispersion sums are positive.

15. The optical waveguide fiber link of claim 14 wherein the respective dispersion sums are no greater than about 4 ps/nm.

16. The optical waveguide fiber link of claim 12 wherein the respective dispersion sums are negative.

17. The optical waveguide fiber link of claim 16 wherein the respective dispersion sums are less negative than about −4 ps/nm.

18. The optical waveguide fiber link of any one of claims 12–17 wherein the respective dispersion sums are equal.

19. The optical waveguide fiber link of claim 12 wherein said cabled optical waveguide fiber has a length in the range of about 30 km to 60 km, a total dispersion of about 3.5 ps/nm-km, and a total dispersion slope in the range of about 0.08 ps/nm$^2$-km to 0. ps/nm$^2$-km, and said cabled dispersion compensating waveguide fiber has a length of in the range of about 8 km to 12 km, a total dispersion of in the range of about −20 ps/nm-km to −30 ps/nm-km, and a total dispersion slope of in the range of about −0.20 ps/nm$^2$-km to −0.30 ps/n m$^2$-km.

20. The optical fiber link of claim 12 wherein the wavelength band is about 1520 nm to 1650 nm.

21. The optical waveguide fiber link of claim 12 wherein said cabled dispersion compensating fiber comprises a dispersion compensating waveguide fiber in accordance with claim 1.

* * * * *